United States Patent [19]

Min

[11] Patent Number: 4,604,563

[45] Date of Patent: Aug. 5, 1986

[54] ELECTRONIC SWITCH FOR STARTING AC MOTOR

[75] Inventor: Young-Kee Min, Milwaukee, Wis.

[73] Assignee: PT Components, Inc., Milwaukee, Wis.

[21] Appl. No.: 680,488

[22] Filed: Dec. 11, 1984

[51] Int. Cl.$^4$ .............................................. H02P 1/04
[52] U.S. Cl. ...................................... 318/786; 318/785
[58] Field of Search ............... 318/785, 786, 778, 779, 318/817, 794

[56] References Cited

U.S. PATENT DOCUMENTS

| 1,974,989 | 9/1934 | Hamm . |
| 2,181,734 | 11/1939 | Mooney . |
| 2,576,084 | 11/1951 | Trevitt . |
| 2,774,021 | 12/1956 | Ehret . |
| 2,919,391 | 12/1959 | Charbonneaux . |
| 2,929,978 | 3/1960 | Petrocelli . |
| 2,991,402 | 7/1961 | Tamotsu Imada et al. . |
| 3,071,717 | 1/1963 | Gordon . |
| 3,071,718 | 1/1963 | Gordon . |
| 3,116,445 | 12/1963 | Wright . |
| 3,202,899 | 8/1965 | Gambill et al. . |
| 3,226,620 | 12/1965 | Elliott et al. . |
| 3,258,668 | 6/1966 | Milligan . |
| 3,307,093 | 2/1967 | Wright . |
| 3,349,307 | 10/1967 | Licata et al. . |
| 3,414,789 | 12/1968 | Prouty . |
| 3,421,064 | 1/1969 | Phillips ............................. 318/786 |
| 3,453,516 | 7/1969 | Conner . |
| 3,530,348 | 9/1970 | Conner . |
| 3,573,579 | 4/1971 | Lewus . |
| 3,667,017 | 5/1972 | Ramirez . |
| 3,671,830 | 6/1972 | Kruper . |
| 3,761,792 | 9/1973 | Witney et al. . |
| 3,766,457 | 10/1973 | Fink, Jr. et al. . |
| 3,777,232 | 12/1973 | Woods et al. . |
| 3,792,324 | 2/1974 | Suarez et al. . |
| 3,859,591 | 1/1975 | Saunders . |
| 3,882,364 | 5/1975 | Wright et al. . |
| 3,895,275 | 7/1975 | Rostad . |
| 3,950,657 | 4/1976 | Sheng et al. . |
| 3,970,908 | 7/1976 | Hansen et al. . |
| 4,065,804 | 12/1977 | Rostad . |
| 4,072,880 | 2/1978 | Oshima et al. . |
| 4,145,646 | 3/1979 | Werderitch . |
| 4,152,758 | 5/1979 | Bailey et al. . |
| 4,292,555 | 9/1981 | Schaefer . |
| 4,307,327 | 12/1981 | Streater et al. . |
| 4,325,012 | 4/1982 | Schaefer . |
| 4,361,792 | 11/1982 | Davis, Jr. et al. ............... 318/798 |
| 4,366,426 | 12/1982 | Turlej . |
| 4,375,613 | 3/1983 | Fuller et al. . |
| 4,382,217 | 5/1983 | Horner et al. . |
| 4,395,671 | 7/1983 | Sandler et al. . |
| 4,399,394 | 8/1983 | Ballman . |
| 4,401,933 | 8/1983 | Davy et al. . |
| 4,422,023 | 12/1983 | Iwasawa et al. . |
| 4,422,030 | 12/1983 | McAllise . |
| 4,453,118 | 6/1984 | Phillips et al. . |
| 4,496,895 | 1/1985 | Kawate et al. . |

FOREIGN PATENT DOCUMENTS

| .0027524 | 4/1981 | European Pat. Off. . |
| 1142248 | 2/1969 | United Kingdom . |

OTHER PUBLICATIONS

Excerpted from the article "What's New in Rotary Speed Switches", by Milton Leonard, Associate Editor, Machine Design; Jul. 27, 1972, Copyright, 1972, by the Penton Publishing Co., Cleveland, Ohio.
SCR Manual, Fourth Edition, General Electric, 1967, pp. 222–223, General Electric Company, Dept. B. 3800 North Milwaukee Ave., Chicago, IL 60641.
"Single-Phase Two-Valued Capacitor Motor Relay Section", D. L. Trower and C. Evert, AIEE Transactions, Feb. 1962, pp. 1141–1143.

Primary Examiner—David Smith, Jr.
Attorney, Agent, or Firm—Andrus, Sceales, Starke & Sawall

[57] ABSTRACT

In an AC motor having a main winding (1) and a start winding (2) both connectable to an AC power source (3), and having a switch (22) for disconnecting the start winding from the AC source, an improved control circuit for the switch is provided. A pulse generator (15) responds to main and start winding or capacitor voltage sensors (11 and 12) for generating a first set of variable width output pulses (16) having a width determined by the phase differential between the voltages. A comparator timer (17) responds to the pulse generator for outputting a second set of variable width pulses (18) having a width determined by the amount of which the pulse width of the pulses of first set (16) exceed a selected duration (42). An output pulse detector (20) responds to the comparator timer for detecting the second set of variable width pulses and outputs a delayed turn-off signal (21) to the switch (22).

12 Claims, 5 Drawing Figures

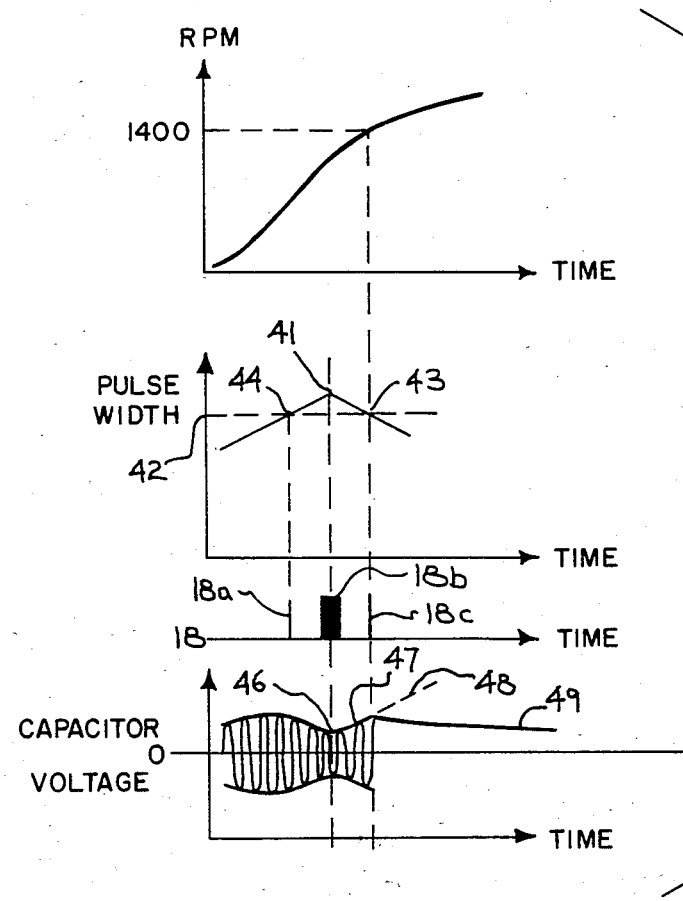
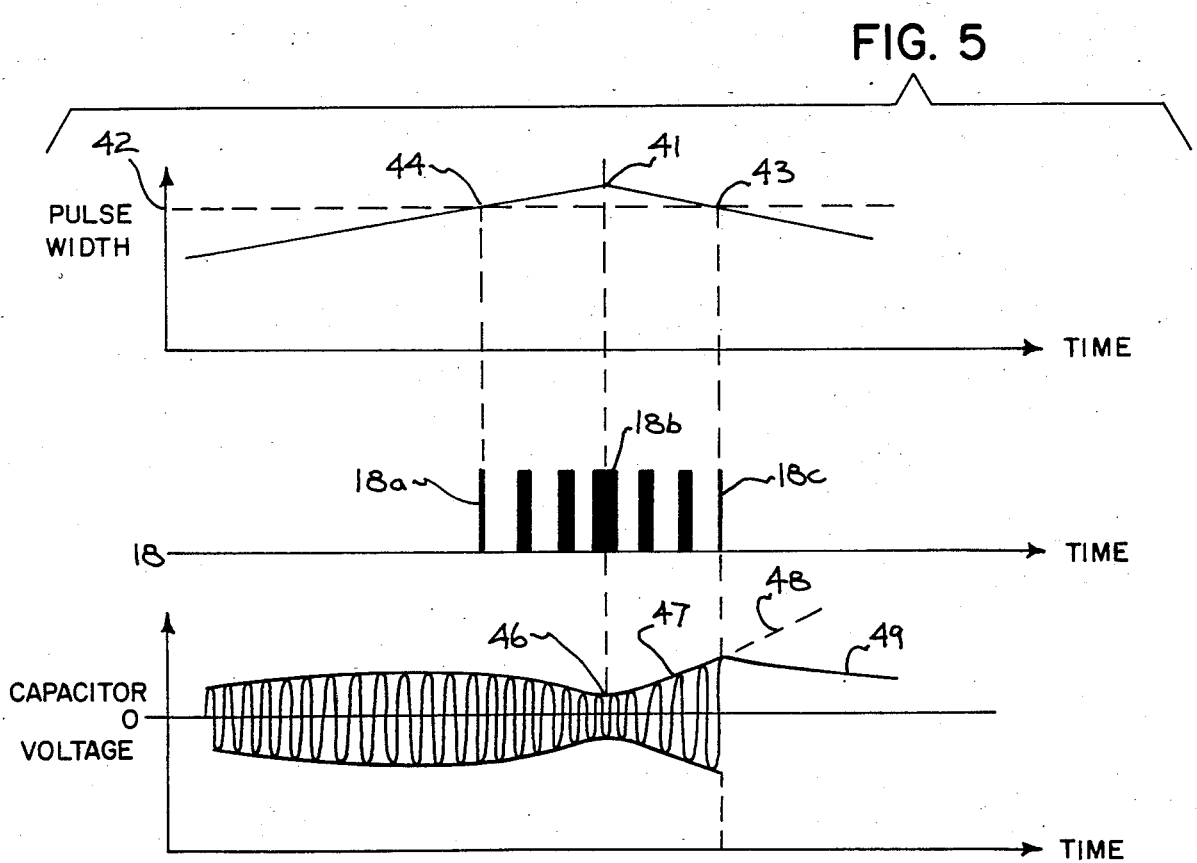
FIG. 4
FIG. 5

ELECTRONIC SWITCH FOR STARTING AC MOTOR

BACKGROUND AND SUMMARY

The invention relates to disconnect switches for the start winding of an AC motor.

An AC motor has a main winding for running the motor, and a start winding energized when starting the motor from rest and then disconnected at a given motor speed. The fields in the main and start windings are phase shifted, for example by capacitance or inductance or a split phase arrangement, to establish a rotating magnetic field for starting torque.

The present invention arose during development efforts attempting to replace the mechanical centrifugal disconnect switch for the start winding in a capacitor start type AC motor, though the invention is not limited thereto. In FIG. 1, main winding 1 and start winding 2 of an AC motor are connectable to an AC power source 3. Capacitor 4 provides the phase shift for starting torque. When the motor reaches a given threshold speed, switch 5 is opened to disconnect start winding 2 from power source 3.

Various types of switches 5, and controls therefor, are known. In one arrangement, a mechanical switch and centrifugal actuator are mounted on the motor shaft or rotor. At a given threshold speed, centrifugal weights are displaced radially outwardly to open the switch. While this type of actuation has proven useful for its intended purpose, it is nonetheless subject to the problems inherent in any mechanical type actuation system, including limited life, fatigue, friction, vibration, mounting position, contact wear, and so on. Also, the centrifugal switch has a radial extent and blocks axial air flow through the motor, which may impair cooling. Furthermore, the centrifugal switch has a given axial extent, thus requiring extra axial room in the motor, which may be objectionable in various applications.

In another known start winding disconnect system, Hall effect sensors are used to detect RPM to actuate a disconnect switch. This approach may be objectionable because of the requirement of adding an extra element such as a magnet on the motor shaft, and the pick-up coil to sense speed. These extra parts and the assembly required may be cost objectionable.

In another known disconnect system, a timer is started at initial energization of the motor. When the timer times out, the disconnect switch is actuated to disconnect the start winding. This approach is not load or speed sensitive, but rather disconnects the start winding after a preselected time regardless of motor speed. This approach is limited to dedicated applications where the load on the motor is known beforehand, and the delay time set accordingly. If the load on the motor is increased, the motor speed may not be up to the desired threshold at the noted cut-out time. On the other hand, if the load on the motor is decreased, the motor will accelerate faster and full voltage will be applied across the capacitor for a longer time than desired, which in turn may damage the motor and/or capacitor. Capacitor burn-out is a significant problem when reducing the loading of the motor in timed disconnect systems.

Another known approach is to sense current through the main winding and then actuate the disconnect switch at a designated condition. This requires a current sensor such as 6, FIG. 1, in series with the main winding and the start winding, which is objectionable to many manufacturers because of the cost of the extra components and the assembly cost of modifying the circuit and inserting such components in series in the circuit. This approach may also be objectionable due to the extra wattage and heat because current is still flowing through sensor 6 in the run mode after starting.

The present invention addresses and solves the above noted and other problems in a particularly simple and effective electronic control for a start winding disconnect switch. The invention is load and speed sensitive and eliminates the need for extra components on the motor shaft, around the shaft, or in series in the motor circuit. There is no physical modification of the components or the windings.

BRIEF DESCRIPTION OF THE DRAWINGS

FIGS. 3-5 are timing diagrams illustrating operation of the circuitry of FIG. 2.

DETAILED DESCRIPTION

Figure 2:
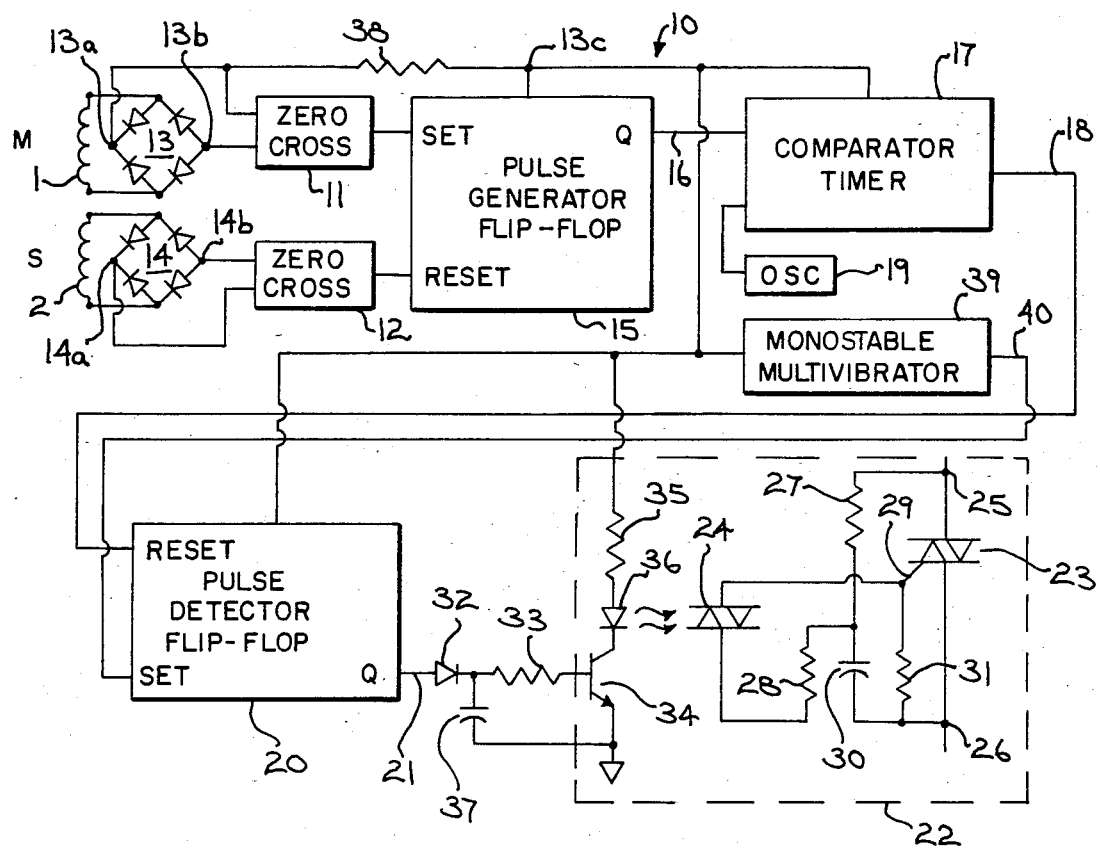
FIG. 2 is a schematic circuit diagram illustrating a start winding disconnect switch and control circuit in accordance with the invention.
Figure 3:
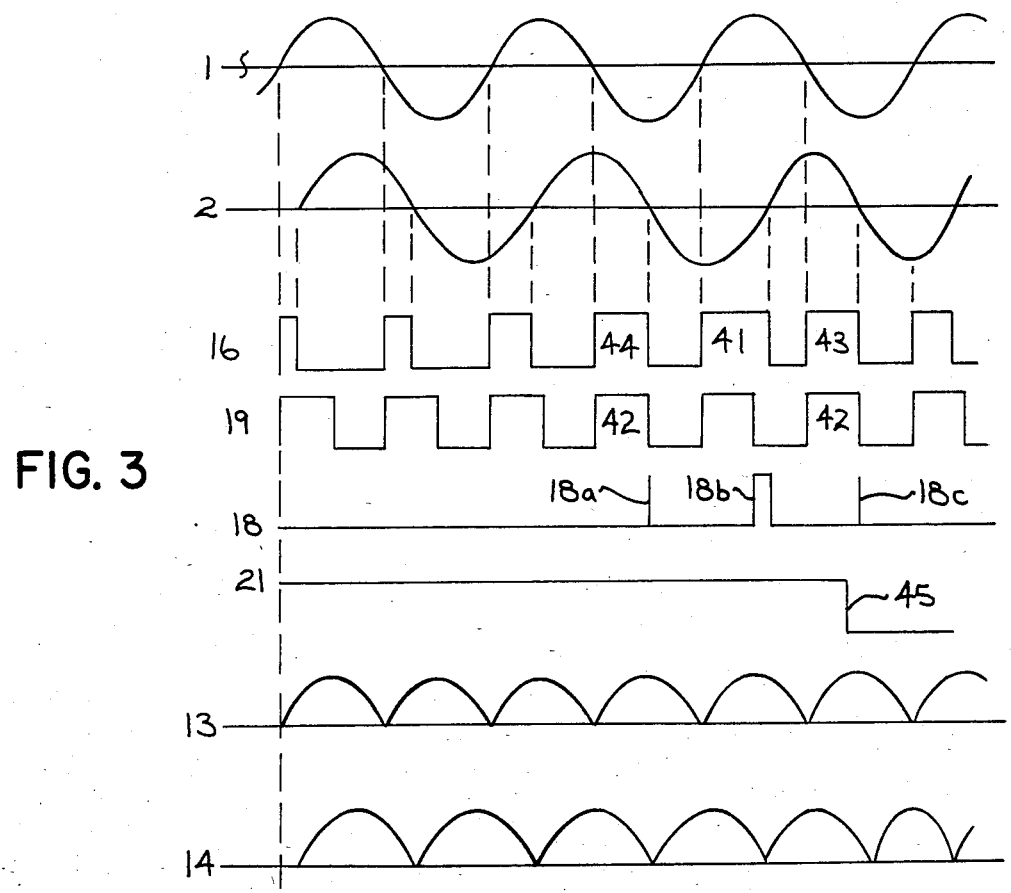

FIG. 2 shows a control circuit 10 including first and second zero crossing detectors 11 and 12 for sensing zero crossings of the main and start winding voltages through rectifying diode bridges 13 and 14 across main and start windings 1 and 2, respectively. The means for sensing start winding voltage may alternatively be connected across capacitor 4. The outputs of zero crossing detectors 11 and 12 are supplied to the set and reset inputs of a pulse generator flip flop 15 which generates a first set of variable width pulses at its Q output 16 having a width determined by the zero crossing phase differential between the main and start winding voltages. FIG. 3 shows in the top two timing lines the voltage waveforms across main winding 1 and start winding 2, and at timing lines 13 and 14 the rectified voltage across the DC outputs 13a, 13b and 14a, 14b of bridges 13 and 14. Timing line 16 shows the Q output of flip flop 15 with a pulse having a variable width determined by the phase differential between the main and start winding voltages.

A comparator timer 17, such as a Signetics 556 dual timer, responds to Q output 16 of flip flop 15 and outputs at 18 a second set of variable width pulses, FIG. 3, determined by the amount by which the pulse width of the pulses of the set at 16 exceed a selected duration determined by oscillator 19 supplying a fixed width pulse for comparison. The second set of variable width pulses on line 18 are supplied to the reset input of a pulse detector flip flop 20 which detects the second set of pulses at 18 and outputs at its Q output a turn-off signal on line 21 to disconnect switch 22 to turn the latter off and disconnect start winding 2.

Figure 1:
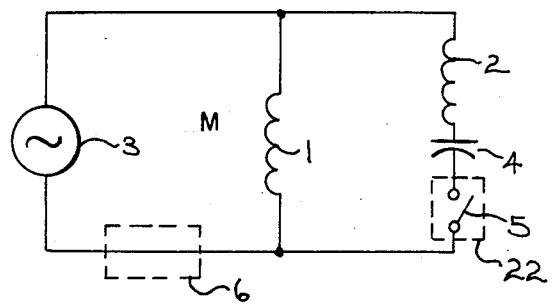
FIG. 1 schematically shows the environment in which the preferred embodiment of the invention is used.

Switch 22 comprises an optically isolated triac driver, as known in the art, for example a Motorola MC3011, and will be only briefly described. Switch 22 includes a triac 23 in series with start winding 2 and having a gate circuit including a light responsive triac 24 for controlling conduction of triac 23. Triac terminal 25 is connected to the bottom plate of capacitor 4 in FIG. 1, and triac terminal 26 is connected to AC source 3. When terminal 25 is positive with respect to terminal 26, and diac 24 is conductive, current flows from terminal 25 through limiting resistors 27 and 28 and through triac 24 to the gate 29 of the triac to bias the latter into conduction such that starting current may flow through triac 23 between terminals 25 and 26. Capacitor 30 and resistor 27 provide a snubber network for opto triac driver 24. Resistor 31 provides gate stability.

The turn-off signal on line 21 is delivered through diode 32 and resistor 33 to the base of bipolar transistor 34 to bias the latter into conduction which in turn completes a circuit through resistor 35 and light emitting diode 36. LED 36 is optically coupled to light responsive triac 24 to activate the latter and initiate conduction of triac 23. Transistor 34 and LED 36 are electrically isolated from triac 24 and triac 23. A capacitor 37 is connected between the output of flip flop 20 and the emitter of transistor 34. Resistor 33 and capacitor 37 provide an RC delay upon capacitor discharge of the turn-off signal on line 21. AC-DC converter 13 provides from its DC output 13a a DC power supply through limiting resistor 38 at 13c for the various components and for LED 36.

During initial starting of the motor, false turn-off of switch 22 due to transients and the like is eliminated by monostable multivibrator 39, which may be the other half of the noted Signetics 556 chip, and upon initialization of the circuit at power-up, responds to voltage at 13c and outputs a one-shot pulse on line 40 to the set input of flip flop 20 to drive the latter's Q output high to thus turn on switch 22. While the one-shot pulse on line 40 is high, flip flop 20 is being continuously set, and hence its Q output remains high even if a turn-off signal appeared on line 18 at its reset input. Flip flop 20 cannot be reset, and hence its Q output cannot transition low, until the one-shot pulse on line 40 has terminated. This provides means for turning on switch 22 during initial starting of the motor and holding switch 22 on for a given duration to prevent false turn-off of switch 22 due to transients and the like.

In many capacitor start type single phase AC motors, it is desirable to disconnect the start winding at about 1,400 RPM for four pole motors, FIG. 4, or 2,800 RPM for two pole motors. The pulse width of pulses in first set 16, FIG. 3, representing the voltage phase differential between the main and start winding voltages, increases with increasing motor speed to a maximum width 41, FIGS. 3 and 4, and then decreases while motor speed continues to increase. The decreasing pulse width 16 passes through a given value 42 at a point 43 corresponding to approximately the 1,400 RPM threshold motor speed at which start winding 2 should be disconnected from AC source 3. In FIG. 4, pulse width 16 passes increasingly through threshold value 42 at point 44 and rises to a maximum at 41 and then passes decreasingly through threshold value 42 at point 43. As seen in FIG. 3, threshold value 42 is provided by reference pulse 19 of constant width. The width of pulses 19 increases with increasing voltage phase differential, with the pulse width at 44 equaling the width 42 of the reference pulse 19, whereafter the pulses 16 continue increasing in width as shown at 41, and then decrease in width as shown at 43, while motor speed continues to increase, FIG. 4.

Comparator timer 17 responds to increasing pulse width of the first set 16 passing through given value 42 prior to maximum value 41 to begin generating the noted second set of variable width pulses 18 whose width is determined by the amount by which the pulse width of pulses 16 exceed the noted selected reference pulse duration 42, as illustrated at 18a–c. Comparator timer 17 responds to the decreasing pulse width of pulses 16 passing back through given value 42 at 43 to terminate generation of the second set of pulses 18. The width of pulses of set 18 is minimum at 18a when first set 16 passes increasingly through given value 42 at 44. The width of the pulses of second set 18 is maximum at 18b when the pulse width of the first set 16 is maximum at 41. The width of the pulses of second set 18 is minimum again at 18c when the pulse width of the first set 16 passes decreasingly back through given value 42 at 43.

Flip flop 20 responds to comparator timer 17 for detecting a pulse of second set 18 between first minimum value 18a and maximum value 18b. If the duration of initial pulse 18a is too short for flip flop 20 to respond, then a succeeding longer pulse such as 18b will trigger flip flop 20. For example, FIG. 5 illustrates increased loading of the motor wherein a longer time is needed before the motor reaches the approximately 1,400 RPM threshold, and a plurality of pulses of increasing width occur in set 18 between minimum value 18a and maximum value 18b. Upon detection by flip flop 20 of its reset input, its Q output transitions low. This transition of the turn-off signal on line 21 is shown at 45, FIG. 3, and is delayed by RC network 33, 37 such that switch 22 is turned off after first minimum pulse width 18a and before second minimum pulse width 18c. When the turn-off signal on line 21 transitions low, it turns off transistor 34, thus stopping current flow through LED 36, which in turn stops emitting light to light responsive triac 24, which in turn is rendered nonconductive, which in turn turns off triac 23, whereby switch 22 disconnects start winding 2 from AC source 3.

In an exemplary application, the discharge duration of RC delay provided by 33, 37 is about 50–80 milliseconds, as this is the time difference between initial minimum width pulse 18a and final minimum width pulse 18c. The depiction in FIG. 5 is thus more realistic than that in FIG. 4, and in fact there will typically be more pulses in set 18 than shown in FIG. 5. If initial pulse 18a is too short for flip flop 20 to detect, then flip flop 20 will likely detect the next pulse which will be wider than 18a, and assuredly the second succeeding pulse which will be even yet wider. If the first succeeding pulse after 18a is detected, the time gap therebetween is only about 8 milliseconds (one half cycle of a 60 hertz source) and thus the slightly extended transition delay at 45 will not be detrimental to the motor or capacitor because it is only a small portion of the 50–80 millisecond delay between 18a and 18c. Likewise, if pulse detection at flip flop 20 does not occur until the second succeeding pulse after 18a, the transition at 45 will be delayed by about 16 milliseconds, which will not be detrimental because neither the motor speed nor the voltage across capacitor 4 can rise fast enough during that short time to cause damage. By providing a varying pulse width in second set 18 which increases between 18a and 18b, the system provides an inherent safety factor and assures that pulse detection by flip flop 20 will occur.

In the capacitor start type application illustrated, capacitor voltage decreases with increasing pulse width of set 16 to a minimum capacitor voltage 46, FIG. 4, corresponding to maximum pulse width values 41 and 18b. Capacitor voltage then increases at 47 with decreasing pulse width of set 16. Switch 22 is triggered before the capacitor voltage rises to a value such as 48 beyond that corresponding to pulse 18c and the first set 16 decreasingly passing back through given value 42 at 43 at the noted threshold motor speed, whereafter capacitor voltage instead decreases asymptotically at 49, protecting capacitor 4 from otherwise rising voltage 48 at higher motor speed.

It is recognized that various alternatives and modifications are possible within the scope of the appended claims.

I claim:

1. In an AC motor having a main winding and a start winding both connectable to an AC power source, and having a switch for disconnecting said start winding from said AC source, an improved control circuit for said switch comprising:

means for sensing main winding voltage;
   means for sensing start winding voltage;
   pulse generator means responsive to each of said voltage sensing means for generating a first set of variable width output pulses having a width determined by the phase differential between said voltages;
   comparator timer means responsive to said pulse generator means for outputting a second set of pulses for turning off said switch to disconnect said start winding from said AC source responsive to a given condition of said first set of pulses;
   output pulse detector means responsive to said comparator timer means for detecting said second set of pulses and outputting a turn-off signal to said switch,
   the pulse width of pulses in said first set of pulses increasing with increasing motor speed to a maximum value, and then decreasing while motor speed continues to increase, said decreasing pulse width passing through a given value corresponding to a threshold motor speed at which said start winding should be disconnected from said AC source,
   said given condition of said first set of pulses to which said comparator timer means responds is said increasing pulse width passing through said given value prior to said maximum value,
   and comprising delay means for delaying one of said first set of pulses, said second set of pulses and said turn-off signal such that said switch is turned off after said pulse width increasingly passes through said given value and before said pulse width decreasingly passes back through said given value subsequent to said maximum value.

2. The invention according to claim 1 wherein said delay means is part of said output pulse detector means and delays said turn-off signal.

3. The invention according to claim 2 comprising transient eliminator means including means for turning on said switch during initial starting of said motor and holding said switch on for the given duration to prevent false turn-off of said switch due to transients and the like.

4. The invention according to claim 3 wherein said transient eliminator means comprises means for turning on said output pulse detector means to output a turn-on signal to said switch for a selected duration regardless of pulses from said comparator timer means.

5. The invention according to claim 4 wherein said output pulse detector means comprises flip flop means having one of its set and reset inputs connected to the output of said comparator timer means, and wherein said transient eliminator means comprises one-shot monostable multivibrator means having an output connected to the other of the set and reset inputs of said output pulse detector flip flop means.

6. In an AC motor having a main winding and a start winding both connectable to an AC power source, and having a switch for disconnecting said start winding from said AC source, an improved control circuit for said switch comprising:

means for sensing said main winding voltage;
   means for sensing start winding voltage;
   pulse generator means responsive to each of said voltage sensing means for generating a first set of variable width output pulses having a width determined by the phase differential between said voltages;
   comparator timer means responsive to said pulse generator means for outputting a second set of variable width pulses having a width determined by the amount by which the pulse width of said pulses of said first set exceed a selected duration; and
   output pulse detector means responsive to said comparator timer means for detecting said second set of variable width pulses and outputting a turn-off signal to said switch;
   wherein the pulse width of pulses in said first set of variable width pulses increases with increasing motor speed to a maximum value, and then decreases while motor speed continues to increase,
   said decreasing pulse width of said first set of pulses passes through a given value corresponding to a threshold motor speed at which said start winding should be disconnected from said AC source,
   said comparator timer means responds to said increasing pulse width of said first set passing through said given value prior to said maximum value to generate said second set of variable width pulses,
   the pulse width of said second set of variable width pulses is minimum when said pulse width of said first set passes increasingly through said given value,
   said pulse width of said second set is maximum when said pulse width of said first set is maximum,
   said pulse width of said second set being minimum again when said pulse width of said first set passes decreasingly back through said given value.

7. The invention according to claim 6 comprising delay means for delaying one of said first set of pulses, said second set of pulses and said turn-off signal such that said switch is turned off after said pulse width of said first set increasingly passes through said given value and before said pulse width of said first set decreasingly passes back through said given value.

8. The invention according to claim 6 wherein said motor is of the capacitor start type and has a starting capacitor in series with said start winding, capacitor voltage decreasing with increasing pulse width of said first set to a minimum capacitor voltage corresponding to said maximum pulse width value of said first set, said capacitor voltage then increasing with decreasing said pulse width of said first set, said switch being turned off before said capacitor voltage rises to a value beyond that corresponding to said pulse width of said first set passing decreasingly back through said given value at said threshold motor speed, whereafter said capacitor voltage instead decreases asymptotically, protecting said capacitor from otherwise rising said voltage at higher motor speed.

9. The invention according to claim 8 wherein said means for sensing start winding voltage is connected across said start winding.

10. The invention according to claim 8 wherein said means for sensing start winding voltage is connected across said capacitor.

11. In an AC motor having a main winding and a start winding both connectable to an AC power source, and having a switch for disconnecting said start winding from said AC source, an improved control circuit for said switch comprising:
- first zero crossing detector means for sensing zero crossings of main winding voltage;
- second zero crossing detector means for sensing zero crossings of start winding voltage;
- first flip flop means responsive to each of said first and second zero crossing detector means for generating a first set of variable width pulses having a width determined by the zero crossing phase differential between said main and start winding voltages;
- comparator timer means responsive to said first flip flop means for outputting a second set of variable width pulses having a width determined by the amount by which the pulse width of said pulses of said first set exceed a selected duration; and
- second flip flop means responsive to said comparator timer means for detecting said second set of pulses and outputting a turn-off signal to said switch.

12. The invention according to claim 11 wherein the pulse width of pulses in said first set increase with increasing motor speed to a maximum value, and then decrease while motor speed continues to increase, said decreasing pulse width of said first set passing through a given value corresponding to a threshold motor speed at which said start winding should be disconnected from said AC source,
- said comparator timer means responds to said increasing pulse width of said first set passing through said given value prior to said maximum value to begin generating said second set of variable width pulses,
- said comparator timer means responds to said decreasing pulse width of said first set passing back through said given value subsequent to said maximum value to terminate generation of said second set of variable width pulses,
- the width of pulses of said second set is minimum when said pulse width of said first set passes increasingly through said given value,
- the width of pulses of said second set is maximum when said pulse width of said first set is maximum,
- the width of pulses of said second set is minimum again when said pulse width of said first set passes decreasingly back through said given value,
- and wherein said second flip flop responds to said comparator timer means for detecting a pulse of said second set between said first minimum value and said maximum value pulse width and outputting said turn-off signal,
- and comprising delay means at the output of said second flip flop for delaying said turn-off signal to said switch such that said switch is turned off after said first minimum width pulse of said second set and before said second minimum width pulse of said second set.

* * * * *